3,236,739
UNDERGROUND NUCLEAR REACTOR
Hans Lange, Wietze, Kreis Celle, Germany, and Günther Schlicht, deceased, late of Hamburg-Othmarschen, Germany, by Erika Marie Schlicht, Hamburg-Othmarschen, Germany, legal representative, assignors to Deutsche Erdol-Aktiengesellschaft
Filed Aug. 6, 1962, Ser. No. 216,702
Claims priority, application Germany, Aug. 8, 1961, Sch 30,107
9 Claims. (Cl. 176—39)

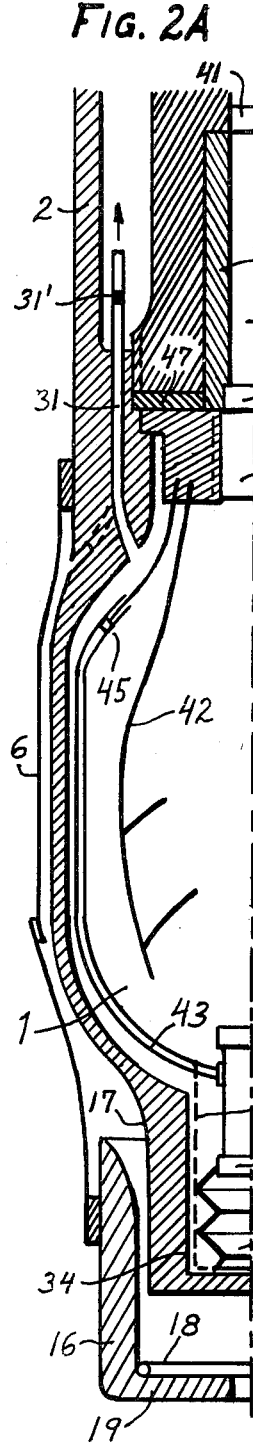

The present invention relates to a nuclear reactor installed underground in a borehole and located in a bituminous deposit, more particularly, to the installation of such a nuclear reactor downwardly through a borehole and the operation of the nuclear reactor when it has been installed in position.

It is already known to mount a nuclear reactor operating under high pressure, in an underground location so that the earth presents additional protection against the radiation emitted from the reactor. In such underground reactors, the walls of the reactor casing can be relatively thin since the pressure generated within the reaction chamber can be transmitted to the earth surrounding the chamber. The various surfaces of the reaction chamber need only have a sufficient thickness to withstand the compressive stresses imposed upon the reaction chamber. Such a nuclear reactor is installed underground through lateral passages leading to the underground space which has been formed, such as by blasting, to receive the nuclear reactor. Such reactors, however, are not suitable for installation into a vertical borehole.

It has been proposed to utilize the heat energy produced by a nuclear reaction to act upon underground bituminous deposits. Since these bituminous deposits are reached through substantially vertical boreholes, the problem is therefore presented of constructing a nuclear reactor which is sufficiently small to be passed downwardly through such a borehole, but which can be still brought to its critical condition at the bottom of the borehole.

In such a small reactor, which is adapted for passage through a borehole, the necessary safety devices represent an uneconomically high portion of the total costs of the nuclear reactor. It has therefore been considered uneconomical to construct such a nuclear reactor for installation through a borehole.

At that depth beneath the surface of the earth at which a nuclear reactor would be installed, the maximum diameter of such boreholes generally ranges from 400 to 500 mm. It is therefore clearly apparent that the diameter of the nuclear reactor to be installed in such a borehole is limited by the diameter thereof. In general, the diameter of the borehole at such depths is not enlarged since the costs of drilling the borehole greatly increase as the diameter thereof increases.

The overall diameter of such a nuclear reactor is further decreased by the required presence of a shield which should have a thickness ranging from 80 to 100 mm. Based upon the prior art, a nuclear reactor which is intended to be installed in a borehole will have such a small diameter after provision for effective shielding has been made, that the costs of constructing such a reactor when considered with respect to the costs of the required safety equipment would be so high as to make the installation and operation of such a nuclear reactor unfeasible.

One proposed solution has been to install the essential components of a nuclear explosive charge on the bottom of a borehole and then bring about a nuclear reaction whereupon the reaction is left uncontrolled. However, up to the present time, this procedure has not been practical.

Since the exterior diameter of a nuclear reactor which is to be lowered into a borehole must not exceed the afore-mentioned 400 to 500 mm., some problems arise in the construction of such a nuclear reactor which would not exist with respect to a conventional reactor. The first problem arises with respect to a shield whose thickness must be about 100 mm. if a nuclear reactor having these limited dimensions is to be economically operated. Elimination entirely of the shield would produce various difficulties in the operation of such a nuclear reactor. A further problem is the proper control of such a nuclear reactor where it is positioned several hundred meters below the surface of the earth. The conventional mechanical devices for lowering and raising the fuel elements or control rods cannot be used with such an underground installation.

A further difficulty resides in adding new fuel to the nuclear reactor. This procedure cannot be accomplished several hundred meters underground using the known devices. Further, when it is desired to no longer operate such a nuclear reactor after the exploitation of the deposit has been completed, it is often desired to recover the fuel of the nuclear reactor for reasons of economy. While satisfactory procedures have been developed for the recovery of fuel from conventional nuclear reactors, such procedures are not at all satisfactory for a nuclear reactor installed at a considerable depth below the surface of the earth.

It is therefore the principal object of the present invention to provide a novel and improved nuclear reactor for installation in a borehole drilled downwardly through the earth.

It is a further object of the present invention to provide a nuclear reactor which can be installed in the bottom of a borehole by lowering the reactor downwardly through the borehole to its desired position.

It is another object of the present invention to provide a nuclear reactor which can be satisfactorily operated and controlled in a borehole at a considerable depth below the surface of the earth.

The nuclear reactor of the present invention essentially comprises a reaction chamber enclosing the fissionable material. An expansible shield is mounted on the reaction chamber so as to closely surround the reaction chamber when the nuclear reactor is being lowered downwardly through a borehole. Upon installation of the nuclear reactor in its desired position in the borehole, the expansible shield is expanded so as to be received into an enlarged portion of the borehole. A space is thus formed between the reaction chamber and the expansible shield which space is filled with a suitable neutron-reflecting substance when the reactor is critical and in operation.

For automatic control of the nuclear reactor, a control-rod assembly is mounted on the exterior of the reaction chamber for insertion therein. The control-rod assembly is operatively connected to a temperature and/or pressure-responsive element which thus regulates the insertion and withdrawal of the control-rod assembly.

The nuclear reactor is also provided with a construction for introducing additional fuel into the reaction chamber in response to a control signal or at a predetermined time. A heat exchanger is mounted above the nuclear reactor within the borehole for extracting the heat produced by the nuclear reaction.

The installation of the nuclear reactor in the borehole is carried out by first boring according to conventional procedures a borehole penetrating the desired bituminous deposit. The bottom of the borehole within the deposit is then enlarged in a conventional manner. The nuclear reactor, together with its expansible shield, is then lowered through the borehole and positioned in the enlarged bottom thereof where the shield is expanded to form a space between the reaction chamber and the shield. The borehole can then be sealed except for a small passage extending from the nuclear reactor to the surface of the earth.

Several structures can be provided for the proper positioning of the nuclear reactor within the borehole and for expanding the shield once the nuclear reactor has been lowered to its desired position.

Other objects and advantages of the present invention will be apparent upon reference to the accompanying description when taken in conjunction with the following drawings wherein;

FIGURE 1 is a schematic cross-sectional elevational view of a nuclear reactor together with its heat exchanger as installed within a borehole prior to expanding of the shield;

FIGURES 2A and 2B are longitudinal sectional views of portions of a modified form of nuclear reactor wherein FIGURE 2A shows the shield before expansion, while FIGURE 2B shows it in its expanded positioin;

FIGURES 5A and 5B are longitudinal sectional views of portions of another modified reactor wherein FIGURE 5A shows the shield before expansion, while FIGURE 5B shows it in its expnaded position;

The detailed description of the present invention may be facilitated by classifying the invention according to the following structures:

1. General Layout and Expansible Shield;
2. Automatic Control Devices;
3. Reserve Fuel Assembly;
4. Fuel Recovery Assembly;
5. Heat Exchanger;
6. Flow Control for Heating Medium;
7. Safety Device;
8. Reactor Positioning Structure.

1. *General layout and expansible shield*

In the present invention, a boiling-water nuclear reactor having a reaction chamber 1 is enclosed in the lower portion of a heat-exchanger housing 2. A heat exchanger 3 is positioned above the reaction chamber 1 within the heat-exchanger housing. This assembly is located within a bore 4 extending downwardly through the earth into a bituminous deposit from the surface of the earth indicated at 5. The diameter of the bore 4 is enlarged at that height at which the reaction chamber is to be positioned.

Figure 4:
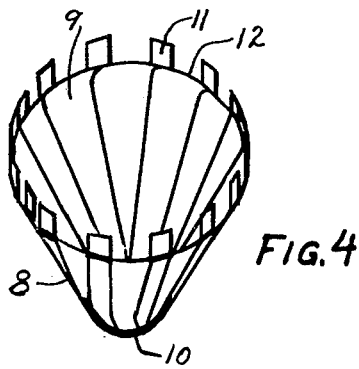
FIGURE 4 is a perspective view of the lower half of the expansible shield.

Closely surrounding the reaction chamber when it is in its non-critical state, is an expansion shield 6 which comprises two bowl-like reflector halves 7 and 8 with half 8 being illustrated in FIGURE 4. Such shield halves are known in the drilling industry under the name of Baker Metal Petal Cementing Baskets.

Each shield half comprises a plurality of overlapping sheet-metal plates 9 whose lower ends are secured to a ring 10 while their upper ends are expansible as shown in FIGURE 4. Each plate 9 has a gear-like extension 11 from its upper end 12. The extension 11 covers only a portion of the edge of each plate. The interior surfaces of the plates 8 are coated with a high-temperature resistant elastic film, such as of plastic or asbestos.

A second shield half 7, which is similar in all respects to the shield half 8 as described above, is positioned so that the larger-diameter open ends cooperate and the extensions 11 mesh with each other to form in effect a single-expansible shield 6. There is an extensible annular metallic band 13 covering the joint between the shield halves 7 and 8 which so overlaps that it covers the joint even when the shield is in its expanded position.

The upper end of shield half 7 is secured to the outer surface of the heat exchanger housing at 14 by a clamp collar.

The lower half of shield half 8 is similarly connected by a clamp collar 15 to a movable cuplike member 16 positioned underneath the reaction chamber 1. The cup member 16 encloses an extension 17 on the lower end of the heat exchanger housing 2. A sealing or cushioning ring 18 is provided within the cup member 16 so as to be engageable with the bottom edge of the extension 17.

When the nuclear reactor is being lowered into a borehole, the shield and cup member 16 are in the position as illustrated in the left-hand half of FIGURE 2. As the lower surface 19 of the cup member 16 engages the bottom of the bore it will be urged into the position as shown in the right-hand half of FIGURE 2. The upward movement of the cup member 16 will expand the shield halves to the position as shown in the right-hand half of FIGURE 2. The shield thus expands into the enlarged portion of the bore which has been previously provided. An electrical contact 81 is provided to signal when the shield has properly expanded.

When the shield is expanded, a space 20 is formed between the reaction chamber and the shield. This space is filled with a neutron-reflecting substance, such as ordinary water, with the thickness of this reflecting layer being between 80 and 100 mm. This water is free from any impurities such as boron.

The water is introduced into the space 20 through a supply pipe which leads from a water chamber 22, located in the heat exchanger housing 2. The water is withdrawn from the space 20 by a pipe 23 which extends to the sump 24 of the space 20. The water chamber 22 may also contain a piston 25 which is freely movable therein so as to leave a space 26 (FIG. 1) above the piston, having apertures 27 therein.

The water can be circulated between the space 20 and aboveground in order to clean the water or to flush the space 20. When the water is circulated in order to remove various impurities therefrom which hinder the nuclear reaction, it is preferable to perform this operation prior to the attaching of the reactor to a casing 28 employed for lowering the reactor into the borehole.

The shield 6 can be constructed so as to have a very thin wall thickness in order to adjust to the small difference in pressure existing between the inside and outside of the shield. The chamber 26 with its apertures 27 forms a pressure-balancing chamber together with the apertures 29 in the heat exchanger housing 2 and the apertures 30 in the casing 28. With this arrangement, the pressure between the outside of the reactor and the reflecting medium space 20 can be balanced.

2. *Automatic control devices*

When ordinary water is used as a liquid neutron moderator within the reaction chamber, the water is passed in heat exchanger relationship with the fissionable material to be converted into steam which is supplied through a steam line 31 to the top of the heat exchanger 3. A return 32 is provided to return the condensate from the heat exchanger to the reaction chamber.

The cooling medium can be vaporized or only strongly heated whereby it is rendered specifically lighter and flows upwardly through conduit 31 and into the heat exchanger. While it cools down in the latter, it again becomes heavier and passes down through conduit 32 and into the reactor core 1, thereby setting up a thermal syphonic circulation. The heat exchanging surface can be made practically as large as desired for any specific diameter because there is almost no limit to the permissible vertical dimensions.

In the event less heat is removed from the heat exchanger 3 than the heat exchanger can provide, the operating temperature of the reaction chamber 1 will then increase to evaporate more and more water into steam. Should this condition prevail the temperature will continue to rise and eventually all of the water moderator will evaporate into steam. This boiling of all of the liquid moderator reduces the density thereof and thus increases the critical size of the reactor. This reduces the neutron reproduction ratio so as to provide an automatic check on the operation of the reactor. The present invention provides for such a volumetric capacity of the reaction chamber, the heat exchanger, and the lines therebetween together with the amount of liquid moderator that a complete evaporation of the liquid moderator will occur at a temperature of 400 to 500° C. and at a pressure of 250 to 300 atm. absolute.

Another automatically operating safety device comprises a temperature-responsive expansible bellows 33, mounted in a recess 34 within the extension 17. The bellows is connected to a control-rod assembly 35, mounted for insertion and withdrawal with respect to the reaction chamber 1. The control-rod assembly, which may be made from boron, is thus inserted or withdrawn into the reaction chamber in response to the temperature thereof.

The expansible bellows 33 may also be made pressure-responsive.

3. Reserve fuel

An additional quantity of fissionable material 36 is provided for use in the reaction chamber 1. This additional quantity of fissionable material is enclosed within a cylindrical container 37 having its lower end closed by a cover plate 38 containing toxic material for the nuclear reaction, positioned in alignment with a screw-threaded bore 39 in a removable head 40 in the top of the reaction chamber. A propellant 41, such as black powder, is mounted on the upper end of the container 37. Means are provided for detonating the propellant 41 in response to a control signal, originating from an above-ground control station. Detonation of the propellant will force the additional fissionable material into the reaction chamber. Instead of the additional fissionable material 36, the container 37 may be filled with a suitable neutron source.

The nuclear reaction within the reaction chamber 1 may also be controlled by perforating the expansible bellows 33 by an explosion detonated from a control station above ground. As a result, the pressure within and without of the expansible bellows will be equalized and the control-rod assembly 35 will be withdrawn from the reaction chamber by the inherent compression force of the bellows.

4. Fuel recovery assembly

Extending from the head 40 into the reaction chamber are recovery arms 42 which have suitable extensions thereon for engaging perforations in the jackets of the fuel elements contained in the reaction chamber. Also within the reaction chamber is a lining 43 secured to the head 40 by straps 44 which are attached to a moveable fastener 45. A further lining 46 is secured to the lower end of the liner 43.

The head 40 is secured in its assembled position by a holding plate 47 secured to the interior of the heat-exchanger housing 2 by means of a bayonet-lock. A locking head 48 is then threaded into the heat exchanger housing 2 on top of the holding plate 47. The fuel container 37 may be secured to the locking head 48 so as to be removeable therewith.

The upper end of the locking head 48 is secured by means of a recovery device 49 to the lower end of a pipe 50, which extends downwardly through the center of the bore 4. The pipe 50 is sealed against the casing 28 by a suitable packing 51. The top of the casing 28 terminates at a point from about 10 to 50 m. below the surface of the ground within the bore 4. A suitable material, such as concrete, indicated at 52 is filled in the space between the casing 28 and the bore 4.

In the process of recovering the fuel from within the reaction chamber, the pipe 50 is rotated in such a manner that the locking head 48 connected thereto by the recovery device 49 is unthreaded from the tapped bore 39. Thus, the locking head and the additional fuel 36 may be removed. Immediately prior to the removal of the locking head 48, a liquid having good neutron-absorbing qualities is introduced into the space 53 at the lower end of the casing 28. Upon the removal of the locking head 48, this liquid will then flow into the reaction chamber 1 through the bore 39.

After removal of the locking head 48, the holding plate 47 is detached and a threaded member screwed into the bore tap 39 to permit the removal of the head 40.

As the head 40 is raised by raising the pipe 50, the recovery arms 42 will engage the apertured fuel elements. The fuel rods are then enclosed in the thin-walled steel liner 43 and the liner extension 46 as the fuel elements are drawn upwardly to the relatively narrow casing 28. After the head 40 has been raised a certain height the entire liner 43 and the liner extension 46 can be raised upwardly by the steel holding straps 44.

Prior to removing of the fuel elements from the bore, a sealable radiation-protective container is introduced into the bore above the casing 28. The fuel elements are drawn up into this container and sealed therein and are then removed from the bore after a suitable period of time has elapsed.

The fissionable material may also be recovered by a chemical process wherein the uranium may be dissolved to a chemical solution. In this recovery procedure it is necessary that the lower portion of the reaction chamber be initially coated with a chemical-resistant material, such as Jena glass or porcelain.

In this chemical recovery process sulfuric acid is introduced into the reaction chamber to dissolve the jackets of the fuel elements and the resulting solution then removed. Subsequently, the fuel element itself is dissolved by nitric acid which is then also removed. Both of the solutions can be removed from the bore by means of special digestors which provide protection against radiation.

5. Heat exchanger system

In order to utilize the heat produced in reaction chamber 1 and transferred to heat exchanger 3, a heating medium, such as oil or gas, is introduced by pressure through the pipe 50 downwardly into the bore. The pipe 50 is provided with apertures 54 in its lower end through which the heating medium flows into casing 28. The casing 28 is provided with apertures 55 opening into the heat exchanger housing 2 beneath the heat exchanger 3. The heating medium then flows upwardly in heat-exchange relationship with the heat exchanger 3 and is discharged from the heat exchanger housing 2 through apertures 29 into the bituminous deposit.

6. Flow control for the heating medium

The circulation of the heating medium during its operation can be controlled by rotation of the pipe 50 which has valve members 56 and 57 thereon. The lower end of the pipe 50 is provided with valve members 56 which co-operate with the apertures 30 in the casing 28 and with valve members 57 which co-operate with the apertures 55 in the casing 28. The valve members 56 and 57 are disposed at an angle of 90° with respect to each other. The pipe 50 is also provided with check valves to permit the downward flow of the heating medium therethrough.

In the position of the pipe 50 as shown in FIGURE 1, the apertures 55 are open and the apertures 30 are closed. Accordingly, the heating medium will flow downwardly through the pipe 50, into the casing 28, outwardly of the casing through the apertures 55, upwardly in heat-exchange relationship with the heat exchanger 3 and outwardly into the deposit through apertures 29.

When the pipe 50 is rotated by 90°, the valve members 57 will close the apertures 55 while the apertures 30 will be opened. In this position of the valve members, the heating medium can bypass the heat exchanger and flow directly into the deposit through the casing apertures 30.

The valve members 56 and 57 may be positioned in intermediate positions so that the apertures 30 and 55 are half open so that the heating medium can be introduced into the deposit in a partially heated state.

The flow of the heating medium as a secondary flow circuit can thus be effectively regulated by rotation of the pipe 50.

The heating medium flows through the pipe 50 to the openings 54 then through the openings 55 for entry into the secondary half of the heat exchanger and is heated here during its upward movement until it reaches openings 29, and from there it enters the stratum.

For the purpose of observing the progress of the nuclear reaction when the reactor is positioned in the bore, only a few measuring instruments are necessary for measuring temperatures and pressures.

This arrangement for the secondary flow of the heating medium should preferably be employed only in those installations where the casing leading to the reactor is fixed to the earth at several points and the annular spaces between these connections are filled with a heat-resistant non-evaporating plastic substance.

Figure 3:
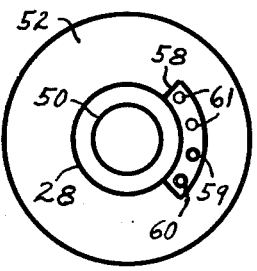
FIGURE 3 is a transverse sectional view of the bore above the nuclear reactor showing an arrangement of control lines for the reactor.

In order to safely connect the cleaning tubes and cables for the measuring instruments from a control station above ground to the reactor, a steel channel 58 is welded on the exterior wall of the casing 28 as may be seen in FIGURE 3. Enclosed within the channel 58 is a steel cable 59, an electric cable 60, and conduits 61 which are extensions of the cleaning pipes 21 and 23.

7. Safety device

A safety device is provided to maintain the nuclear reactor in a non-critical condition during the transportation and installation thereof. During the installation of the nuclear reactor the liquid moderator, in this case ordinary water, is retained in the heat exchanger 3. The lines 31 and 32 are provided with fuseable plugs 31', 32' which melt when a predetermined temperature is reached and thus open the two plugged conduits to permit the circulation of the water through the reaction chamber. The temperature at which these plugs melt may be that of the deposit in which the nuclear reactor is to be installed or the temperature of the plugs may be raised by an electrical-resistance heating device controlled from above-ground.

In addition to the foregoing, the control-rod assembly 35 is positioned in its wholly inserted position and retained in this position by a fuseable metallic collar indicated at 62. The melting of this fuseable collar either by the temperature of the bituminous deposit or by a suitable electrical heating assembly controlled from above-ground will cause the control-rod assembly to be withdrawn to its normal operating position by the expansible bellows 33.

8. Reactor positioning structure

The present invention also contemplates the positioning of a nuclear reactor at some midpoint in the borehole at a depth from the surface of the earth which is sufficient for safety reasons, so that in case of an uncontrolled nuclear reaction or of any accident there will be a sufficient thickness of earth covering the nuclear reactor to protect against radiation. Since the drilling of a borehole having a diameter sufficient to receive a nuclear reactor is a major cost factor in such an installation of a nuclear reactor, it is a great economical advantage when the diameter of the bore may be reduced. Accordingly, the present invention provides for the mounting of a nuclear reactor above the base of the bore with that portion of the bore below the nuclear reactor and extending to the bituminous deposit having a smaller diameter.

In those particular installations wherein the bituminous deposit is either liquid or must only be heated a small amount in order to make the bituminous deposit less viscous, the reactor can be installed as high as possible above the bituminous deposit while still below the depth constituting the safety zone.

Figures 5A, 5B:
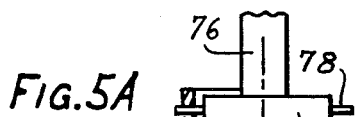
Figure 6:
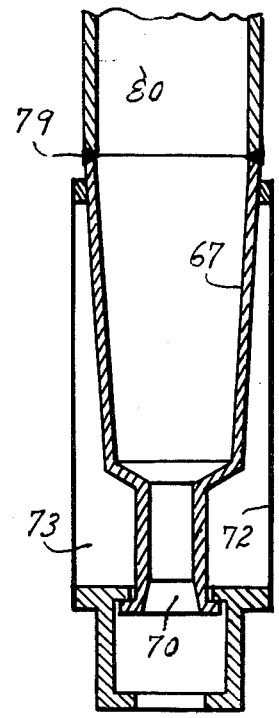
FIGURE 6 is a longitudinal sectional view of another modified device for lowering the reactor of FIGURES 5A and 5B into place.

A structure for positioning the nuclear reactor on the shoulder in the borehole which is the dividing line between the borehole of reduced diameter and the borehole of larger diameter is illustrated in FIGURES 5A, 5B and FIGURE 6.

That portion of the bore in which the reactor is to be installed, is enlarged as previously described and this enlarged portion is filled with concrete to form a concrete chamber 63. The chamber is then enlarged as shown at 64 in order to accommodate the expanded shield of the nuclear reactor. The bottom of the concrete chamber is provided with an opening 65 which communicates with the smaller diameter borehole passing through the earth 66 upon which the concrete chamber is supported.

The reactor positioning structure comprises a tapering or conical base 67 having a reduced diameter portion 68 at its lower end and an external flange 69 at the bottom thereon. The opening in the bottom of the conical base is tapered as shown at 70.

The flange 69 is slidably received within a seat member 71. An expansible shield 72 is secured at its upper end to the conical base 67 and at its lower end to the seat member 71. The space between the shield 72 and the conical base 67 is filled with a neutron-reflector substance which may be a liquid, such as ordinary water or other suitable material such as graphite or beryllium indicated at 73.

When the seat member 71 is located on the bottom of the concrete chamber as shown in FIGURE 5A, a continued lowering of the conical base 67 will bring the base to the position shown in FIGURE 5B. In this position the expansible shield will be expanded into the enlarged portion 64. The conical opening 70 will be seated upon the tapered end 74 of the bore tube 75 so as to form a sealed connection therewith.

This reactor positioning structure as described above may be lowered into the bore by use of a removable pipe 76 on the lower end of which is fastened a mounting plate 77 which in turn is connected by shear pin 78 to the conical base 67. When the conical base has been set in the position as shown in FIGURE 5B, further downward forces can be applied by the pipe 76 to shear the pin 78 and so to separate the conical base 67 from the lowering means.

As an alternative installation structure for lowering the reactor positioning structure into place, reference is made to FIGURE 6 wherein the upper edge of the conical base 67 is welded at 79 to a casing 80 having approximately the same diameter as the conical base.

The reaction chamber is then correspondingly formed with a tapered outer wall to fit in the conical base 67. Thus, a subsequent lowering of the reaction chamber through the bore will result in a positioning of the reaction chamber according to the location of the conical base 67 so that the installed position of the reaction chamber is precisely determined.

Thus it can be seen that the present invention discloses an improved installation of a nuclear reactor for the heating of underground deposits. The nuclear reactor is of the boiling-water type having a primary circulation between the reaction chamber and the heat exchanger and a secondary circulation between the heat exchanger and the deposit.

The heating of underground deposits presents many problems since the sizes, shapes, and compositions of these deposits vary widely. It would thus appear that a new reactor will have to be developed for each underground deposit encountered which would involve all of the problems encountered in the development of a new prototype reactor. The present invention therefore proposes to mount two or more reactors whose capacities are so related to each other that the combined reactor operation will be sufficient for the particular underground deposit encountered. The primary circulating system can be so arranged that all of the reactors operate with one central heat exchanger or each of the reactors is connected to a particular portion of a central heat exchanger. In addition, a plurality of heat exchangers may be provided and connected in series to one or more nuclear reactors.

Once the nuclear reactor is located in a concrete chamber or cemented into position in the bore, the sole direct connection with the reactor and the surface of the ground is through a pipe having a plurality of check valves therein which automatically close when a predetermined excess pressure develops in the zone of the reactor. These check valves are located over the entire length of the pipe or casing communicating with the reactor. The quantity of the fissionable material employed is such that when considering the depth at which the nuclear reactor is installed underground, there will be no effects above ground even under the most unfavorable occurrence of the nuclear reaction.

The mounting of a reactor in a bore will be more clearly understood from the following detailed description.

The novel and improved nuclear reactor of the present invention was mounted in a petroleum deposit at a depth of 1500 m. An ascending tube having a diameter of 406.4 mm. as well as a protective casing with a diameter of 339.7 mm. were mounted into a normal petrolum extraction bore. The protective casing was cemented in down to the fresh water level, while the lower 20 m. remained filled with a highly viscous thixotropic bore scavenging liquid having a specific gravity of 1.48 kg./l. and a gel size of 3 g./cm.$^2$.

The bore having a diameter of 311 mm. was drilled down to a further depth through the protective string of casing. On the base of the bore, at the height of the reactor chamber to be mounted in the bore, there was undercut a length of 1300 mm. to 520 mm. by means of an adjustable undercutter in order to provide space for the mounting of the shield which had a diameter of 520 mm. The power reactor, the reaction chamber of which had an exterior diameter of 300 mm., was then lowered down along a bore string of casing having a diameter of 139.7 mm.

When the reactor was put on the base of the borehole, the shield rested against the chamber of the reactor and was partly positioned beneath the same. The shield was expanded to a diameter of 520 mm. The annular space formed between the wall of the reactor and the wall of the reflector had a width of 100 mm. and was filled from aboveground through a supply pipe with an inside diameter of 2 mm. with water as a neutron reflecting liquid. A second conduit connected to the head of the reflector also led upward again, whereby the conduit and the reflector were flushed and the water controlled as to its freedom from reactor poisons.

An ascending tube commonly employed in petroleum extraction having a diameter of 77.8 mm. and being provided with an insulation layer having a thickness of 20 mm. was connected to the reactor.

When the mounting was completed and the reactor was filled, the string of casing to which the reactor was fixed was then cemented in by means of manifold cement bridges. It is sufficient therefore to arrange in the lower ⅔ of the bore 3 cement bridges at a distance of 300 m. apart and a thickness of 100 m. each. In the remaining section the bore drilling mud remains.

At the bottom of the outer casing where the drilling mud accumulates outwardly of this casing, the center string of casing was sealingly and fixedly connected with the outer string of casing by a packer. These measures provide for an absolutely safe installation of the reactor, and it is as well secured against any blow-out in case of a maximum accident, if return flaps are mounted in the ascending tubes spaced at a distance of 200 m. from each other. No radioactive substances can escape from the borehole. All the time while being in operation the reactor was inaccessible.

The reactor had a high negative temperature coefficient so that it functioned automatically and did not need any control devices. In addition, a pressure or temperature responsive bellows was mounted in which pushed a control rod assembly into the chamber of the reactor when the pressure or the temperature became too high.

The reactor had a primary circuit with an initial temperature in the heat exchange of 273° C. With an interior diameter of 275 mm. the reactor as a heterogeneous reactor contained about 3.8 kg. of fuel which contained $U_{235}$ in a concentration of 90%. In case a homogeneous reactor is to be provided, about 7 kg. of fuel, enriched to 90% with $U_{235}$ would be necessary, depending on the construction of the heat exchanger. Since no pump can be used in the bore, the circulation between the reactor and the heat exchanger in the primary circuit has to be effected by a thermosiphon action. For this purpose, the ascending tube and the gravity-feed pipe had a vertical length of more than 8 m. The capacity of the reactor was 1,000,000 kcal. per hour. In the interior system of the reactor a pressure of about 155 atomspheres absolute prevailed at the mentioned initial temperature. Light water was used as a moderator. It was introduced into the reaction chamber, controlled from aboveground, only after the reactor was solidly cemented in position. By bringing the fissionable material, contained already in the reactor into contact, the reactor is brought to its critical condition and starts to deliver power.

The petroleum deposit into which the reactor had been mounted, contained at a depth of 1500 m. and a thickness of 20 m. and a deposit temperature of 60° C., petroleum having a viscosity of 8.5 cp. and a well afterflowing edge water having a viscosity of 0.53 cp. By heating the petroleum in the vicinity of the oil-water junction zone to 135° C. the viscosity of the oil was reduced to 1.78 cp. and that of the water to 0.38 cp. Thereby the relation of the viscosity of the oil between that of the afterflowing edge water drops from 24.3 to 4.75. The more favorable relationship of the viscosity of the oil to that of the water substantially diminishes the risk that channels are formed, so that the extracted quantity of oil increases despite the decrease in the extraction time.

In order to prevent radioactive substances from emerging aboveground through the extraction bores, Geiger counters, serving as pulse senders for closing devices arranged on the bores, are inserted into the bores. However, since the flowing time from one bore provided with a reactor to another extraction bore lasts more than 200 days, any possible radioactivity will have died away within that time.

It will be understood that this invention is susceptible to further modification and, accordingly, it is desired to comprehend such modifications within this invention as may fall within the scope of the appended claims.

What is claimed is:

1. A nuclear reactor particularly adapted for underground installation in a bore-hole, and comprising a reaction chamber having means therein for sustaining a nuclear reaction, said reaction chamber having an outer diameter smaller than the diameter of the bore-hole to enable the reaction chamber to be lowered downwardly therethrough, an expansible shield closely surrounding said reaction chamber throughout the entire height of said chamber but expansible to a greater diameter while still closely surrounding said chamber at the upper and lower ends of the latter, the upper end of the shield being secured to the upper end of the chamber while the lower end of the shield carries a cuplike member adapted to be seated upon the bottom of the bore-hole to permit expansion of the shield by further lowering of the reactor, and then to support the reactor from beneath independently of the expansible portion of the shield, said expanded shield providing a space between the shield and reaction chamber and means for supplying light water to said space.

2. A nuclear reactor as claimed in claim 1, wherein said expansible shield comprises a pair of bowl-shaped halves with each half further comprising a plurality of overlapping metallic sheets, the ends of the sheets at the larger diameter openings of the bowls intermeshing to lock the open ends of the bowl halves together, and a metallic member encircling the intermeshing edges of said bowl halves.

3. A nuclear reactor particularly adapted for underground installation in a bore-hole, and comprising a reaction chamber having means therein for sustaining a nuclear reaction, said reaction chamber having an outer diameter smaller than the diameter of the bore-hole to enable the reaction chamber to be lowered downwardly therethrough, an expansible shield closely surrounding said reaction chamber throughout the entire height of said chamber but expansible to a greater diameter while still closely surrounding said chamber at the upper and lower ends of the latter, the upper end of the shield being secured to the upper end of the chamber while the lower end of the shield carries a cuplike member adapted to be seated upon the bottom of the borehole to permit expansion of the shield by further lowering of the reactor, and then to support the reactor from beneath independently of the expansible portion of the shield, said expansible shield providing a space between the shield and the reaction chamber for receiving light water, a control rod assembly movable into and outwardly from the bottom of the reaction chamber and a temperature responsive expansible bellows carried by said reaction chamber and operatively connected to said control rod assembly.

4. A nuclear reactor particularly adapted for underground installation in a bore-hole, and comprising a reaction chamber having means therein for sustaining a nuclear reaction, said reaction chamber having an outer diameter smaller than the diameter of the bore-hole to enable the reaction chamber to be lowered downwardly therethrough, an expansible shield closely surrounding said reaction chamber throughout the entire height of said chamber but expansible to a greater diameter while still closely surrounding said chamber at the upper and lower ends of the latter, the upper end of the shield being secured to the upper end of the chamber while the lower end of the shield carries a cuplike member adapted to be seated upon the bottom of the borehole to permit expansion of the shield by further lowering of the reactor, and then to support the reactor from beneath independently of the expansible portion of the shield, said expansible shield providing a space between the shield and the reaction chamber for receiving a neutron-reflecting substance, and means on top of said reaction chamber and controlled from above ground for introducing additional fuel into said chamber.

5. A nuclear reactor particularly adapted for underground installation in a bore-hole, and comprising a reaction chamber having means therein for sustaining a nuclear reaction, said reaction chamber having an outer diameter smaller than the diameter of the bore-hole to enable the reaction chamber to be lowered downwardly therethrough, an expansible shield closely surrounding said reaction chamber throughout the entire height of said chamber but expansible to a greater diameter while still closely surrounding said chamber at the upper and lower ends of the latter, the upper end of the shield being secured to the upper end of the chamber while the lower end of the shield carries a cuplike member adapted to be seated upon the bottom of the borehole to permit expansion of the shield by further lowering of the reactor, and then to support the reactor from beneath independently of the expansible portion of the shield, said expansible shield providing a space between the shield and the reactor for receiving a neutron-reflecting substance, a heat exchanger mounted above the reaction chamber, a conduit connecting the upper portion of the heat exchanger with the upper portion of the reaction chamber and another conduit connecting the lower portion of the heat exchanger with the same reaction chamber for the circulation of heating fluid.

6. A nuclear reactor particularly adapted for underground installation in a borehole, and comprising a reaction chamber having means therein for sustaining a nuclear reaction, said reaction chamber having an outer diameter smaller than the diameter of the borehole to enable the reaction chamber to be lowered downwardly therethrough, an expansible shield closely surrounding said reaction chamber throughout the entire height of said chamber but expansible to a greater diameter while still closely surrounding said chamber at the upper and lower ends of the latter, the upper end of the shield being secured to the upper end of the chamber while the lower end of said shield carries a cuplike member adapted to be seated upon the bottom of the borehole to permit expansion of the shield by further lowering of the reactor, and then to support the reactor from beneath independently of the expansible portion of the shield, said expansible shield providing a space between the shield and the reactor for receiving a neutron-reflecting liquid, a chamber whose upper end is in open communication with the borehole mounted on the reactor, a piston freely movable in said last-mentioned chamber, and a conduit connecting the lower portion of said last-mentioned chamber with the space between the shield and the reactor.

7. A nuclear reactor particularly adapted for underground installation in a borehole, and comprising a reaction chamber having means therein for sustaining a nuclear reaction, said reaction chamber having an outer diameter smaller than the diameter of the borehole to enable the reaction chamber to be lowered downwardly therethrough, an expansible shield closely surrounding said reaction chamber throughout the entire height of said chamber but expansible to a greater diameter while still closely surrounding said chamber at the upper and lower ends of the latter, the upper end of the shield being secured to the upper end of the chamber while the lower end of the shield carries a cuplike member adapted to be seated upon the bottom of the borehole to permit expansion of the shield by further lowering of the reactor, and then to support the reactor from beneath independently of the expansible portion of the shield, a tubular casing extending downwardly through said borehole to said reaction chamber, a pipe within said casing and communicating therewith, a heat exchanger surrounding said casing and being enclosed by a housing, and means for circulating a fluid medium downwardly through said pipe into said casing and into said housing in heat-exchange relationship with said heat exchanger and then outwardly of said housing into said borehole to heat the surrounding deposit.

8. A nuclear reactor as claimed in claim 7, wherein said pipe is concentric with said casing and rotatable therein and provided with a rotatable valve cooperating with passages in said casing.

9. A nuclear reactor particularly adapted for underground installation in a borehole, and comprising a reaction chamber having means therein for sustaining a nuclear reaction, said means including fissionable material enclosed in a thin-walled aperture protective jacket said reaction chamber having an outer diameter smaller than the diameter of the borehole to enable the reaction chamber to be lowered downwardly therethrough, there being a removeable head in the top of said reaction chamber, there further being a locking head positioned above said removeable head to secure said removeable head in position, means extending from said removeable head into said reaction chamber for supporting the fissionable material thereon, an expansible shield closely surrounding the reaction chamber throughout the entire height of said chamber but expansible to a greater diameter while still closely surrounding said chamber at the upper and lower ends of the latter, the upper end of the shield being secured to the upper end of the chamber while the lower end of the shield carries a cuplike member adapted to be seated upon the bottom of the borehole to permit expansion of the shield by further lowering of the reactor, and then to support the reactor from beneath independently of the expansible portion of the shield, and a pipe within said borehole connected to said locking head for removal thereof so as to unlock said removeable head and permit the removal of said removeable head together with the fissionable material, said fissionable material supporting means comprising a plurality of holding arms having projections thereon engageable with said apertures in said jacket.

References Cited by the Examiner
UNITED STATES PATENTS

| | | | |
|---|---|---|---|
| 2,952,019 | 9/1960 | Goodman. | |
| 3,031,393 | 4/1962 | Saur et al. | |
| 3,042,599 | 7/1962 | Biehl. | |
| 3,079,995 | 3/1963 | Natland | 166—11 |
| 3,080,918 | 3/1963 | Natland | 166—11 |
| 3,085,957 | 4/1963 | Natland | 166—11 |
| 3,086,471 | 4/1963 | Malaker. | |
| 3,089,834 | 5/1963 | Madsen | 176—30 |

FOREIGN PATENTS 217,265 9/1958 Australia.

REUBEN EPSTEIN, *Primary Examiner.*

CARL D. QUARFORTH, *Examiner.*